United States Patent [19]

Steckler et al.

[11] 3,816,354

[45] June 11, 1974

[54] ALKYL AROMATIC POLYSULFONATE SURFACTANTS

[75] Inventors: Robert Steckler, Crofton; John M. Folliot, Baltimore; Morris J. Warren, Bowie, all of Md.

[73] Assignee: Alcolac Inc., Baltimore, Md.

[22] Filed: July 27, 1971

[21] Appl. No.: 166,633

[52] U.S. Cl. ................................ 252/558, 260/505
[51] Int. Cl. .............................................. C11d 1/22
[58] Field of Search ........... 252/539, 558, 559, 353; 260/505 R, 505 A, 505 N, 668 C, 671 B

[56] References Cited
UNITED STATES PATENTS

| | | | |
|---|---|---|---|
| 2,180,314 | 11/1939 | Thomas........................... | 260/505 R |
| 2,607,740 | 8/1952 | Vilale et al. ..................... | 252/153 |
| 2,620,353 | 12/1952 | Lippincott et al. ............... | 260/505 |
| 2,629,697 | 2/1953 | Langdon et al. .................. | 252/559 |
| 2,687,420 | 8/1954 | Brady............................... | 260/505 |
| 2,802,866 | 8/1957 | Salzmann et al. ............... | 260/505 S |
| 2,836,619 | 5/1958 | Kirk et al. ........................ | 260/505 |
| 2,882,301 | 4/1959 | Sias et al. ......................... | 260/505 |
| 2,908,651 | 10/1959 | Grifo................................ | 252/153 |
| 2,940,936 | 6/1960 | Fike ................................. | 252/559 |
| 2,952,639 | 9/1960 | Sullivan et al. .................. | 252/559 |
| 2,978,416 | 4/1961 | Fein et al. ........................ | 252/559 |
| 3,085,067 | 4/1963 | Anderson......................... | 252/153 |
| 3,101,324 | 8/1963 | Wixon.............................. | 252/558 |
| 3,358,017 | 12/1967 | Seifert............................. | 260/505 N |
| 3,458,447 | 7/1969 | Shultz ............................. | 252/539 X |

FOREIGN PATENTS OR APPLICATIONS

| | | |
|---|---|---|
| 452,271 | 11/1948 | Canada |
| 820,340 | 9/1959 | Great Britain |

OTHER PUBLICATIONS

Chem. Absts. – "The Prep. and the Surface Activities of Salts of Diphenylalkanesulfonic Acids," by Kasai, et al. – p. 12974d.

Primary Examiner—Leon D. Rosdol
Assistant Examiner—P. E. Willis
Attorney, Agent, or Firm—Henry B. Kellog; George L. Tone

[57] ABSTRACT

Mixed diphenylalkanes, which are obtained as a by-product in the process of alkylating benzene with olefins or partially chlorinated paraffins, are converted into low cost biodegradable surfactants by sulfonation with oleum, sulfur trioxide or chlorosulfonic acid, followed by neutralization with a basic material to yield a hazy or cloudy heterogenous liquid and converting the said liquid into a clear solution by the addition thereto of a lower alkyl alcohol, lower alkyl ketone, glycol, diacetone alcohol or dioxane.

The surfactants obtained are especially useful in the preparation of emulsion or suspension homo-and co-polymers that are resistant to polyelectrolytes and which possess excellent mechanical stability and shear resistance.

10 Claims, No Drawings

ALKYL AROMATIC POLYSULFONATE SURFACTANTS

It is known that detergent compositions consisting of an alkali metal salt of a sulfonated alkaryl can be produced by the aluminum chloride catalyzed alkylation of benzene with a partially chlorinated petroleum hydrocarbon fraction consisting essentially of $C_{10}$ to $C_{18}$ straight chain parafins. The aluminum chloride sludge is removed from the alkylation reaction mixture and the effluent treated with sulfuric acid and washing with a caustic solution. The resulting washed crude is then subjected to distillation wherein the unreacted light ends are taken overhead. The desired products, mixture of linear alkyl benzenes, are taken as intermediate cuts leaving heavy bottoms which contain a substantial amount of diphenyl alkanes. The mixture of linear alkyl benzene is then sulfonated by any one of a number of conventional methods while employing either oleum, $SO_3$ mixtures of $SO_3$ and $SO_2$ or chlorosulfonic acid.

The heavy bottoms, by-products of the alkylation reaction, have no commercial value as such. Moreover, the diphenylalkanes have no value as surfactant precursors. To convert the heavy bottoms, i.e., the diphenylalkanes, into possibly useful products, it has been proposed to further alkylate them with olefins or chloroparaffins in the presence of aluminum chloride as a catalyst. The resulting alkylate is a mixture of products which, upon fractionation, can be separated into a dialkylbenezene-rich portion which has been suggested as an oil-soluble sulfonation feedstock and into a mono-alkylated diphenylalkane rich portion which may be useful as a synthetic lubricant.

The sulfonation of the diphenylalkanes obtained as above requires as the essential feature, that the reactants, i.e., diphenylalkanes and sulfonating agent such as chlorosulfonic acid or sulfur trioxide, be dissolved in a liquid polychlorinated aliphatic hydrocarbon such as methylene chloride, carbon tetrachloride, perchloroethylene, ethylene dichloride, etc., in amounts ranging from 2 to 20 percent by weight of the reactants. This feature has been recognized by the prior art in the preparation of alkyl diphenyl ether sulfonates as described in the A. F. Steinhauer U.S. Pat. No. 2,854,477 of Sept. 30, 1958.

It has also been proposed to treat the heavy bottoms, i.e. diphenylalkanes, directly with incremental amounts of aluminum chloride (from about 5 to 15 percent based on the weight of the bottoms) at a temperature between 50° and 80° C. for a period of time ranging from at least 6 to as high as 9 hours to yield monophenylalkylates which are alleged to be capable of sulfonation into monosulfonate derivatives useful as water-soluble surfactants.

From the foregoing proposals, it is clearly manifest that to convert diphenylalkanes into useful products entails costly time consuming and involved procedures.

It is the principal object of the present invention to provide a low cost diphenylalkane polysulfonate surfactant which is a clear liquid and biodegradable.

Other objects and advantages will become apparent from the following description.

The sulfonation of crude diphenylalkanes which are obtained as by-product in the alkylation of benezene with olefins or partially chlorinated paraffins or mixtures of such paraffins while employing chlorosulfonic acid, or oleum and frequently also a diluent such as methylene chloride, isopropyl ether, or sulfuric acid, etc., results in a product which does not compare favorably in water solubility and wetting time with competitive alkyl benzene sulfonate type surfactants. In short, the water solubility and wetting time are poor. Moreover, the neutralized aqueous solution of the sulfonated product is cloudy or hazy and sometimes to the point of opaqueness and appears heterogeneous due to the presence of a large amount of a soft, smeary and insoluble sulfonate. This insoluble portion is extremely difficult to remove by filtration or by centrifuging, resulting in high losses and low yields, thereby increasing the cost over that of conventional competitive surfactants. Recovered fractions, which were insoluble in the clear, aqueous phase of the soluble part of the surfactant, showed solubility of less than 10 percent and sometimes less than 5 percent in water. On prolonged standing two liquid layers form giving a heterogeneous appearance. In view thereof, the neutralized sulfonated product does not possess any commercial merit.

Surprisingly and unexpectedly, we found that when about 10 percent to about 15 percent by weight (based on the weight of the heterogeneous liquid) of a water soluble, oxygen containing, organic liquid compound is added to the heterogeneous liquid (neutralized sulfonated product), a clear and stable solution is formed which is equal in performance to some commercially available surfactants and which is especially adaptable as a surfactant for emulsion polymerizations since it produces excellent emulsions characterized by outstanding mechanical stability and resistance to polyelectrolytes and salts.

The water soluble, oxygen containing, organic liquids we employ appear to function as solvating or coupling agents for the smeary, soft, insoluble sulfonate which causes the heterogeneous appearance of the neutralized sulfonated product.

As examples of such organic liquids, lower alkyl alcohols, such as methanol, ethanol, n-propanol and isopropanol; lower alkyl ketones, such as acetone, methylethyl ketone, diethyl ketone, methylpropyl ketone, and isopropyl- methyl ketone; glycols, such as ethylene glycol, trimethylene glycol and tetramethylene glycol, diacetone alcohol, dioxane, and the like, are illustrative. Of these liquids, we prefer to employ isopropyl alcohol as the solvating or coupling agent because of its low cost, its relatively insignificant effect upon free radical vinyl polymerizations, its boiling point, and low toxicity.

The diphenylalkanes employed in accordance with the present invention are produced, as pointed out above, as a by-product of the manufacture of linear alkylbenzene detergent alkylates. Chlorination of the n-paraffins gives primarily monochloride, but some di and polychlorides are also produced. The diphenylalkanes result from the dichlorides during alkylation of benzene with the chlorinated n-paraffins as described in U.S. Pat. Nos. 3,272,881; 3,316,294 and 3,401,208 the teachings of which are incorporated herein by reference. The crude alkylation mixture is separated by fractional distillation into the following cuts of increased boiling points:

| Fraction No. | Major Components |
|---|---|
| 1 | benzene |
| 2 | n-paraffin |
| 3 | linear alkyl benzene |
| 4 | diphenylalkanes |
| 5 | dialkylbenzene |

The isomer distribution of the diphenylalkanes, fraction 4, is not known. The chemistry of the system, however, leads one skilled in the alkylation art to expect a somewhat random distribution of attachment of the two benzene rings to the alkane chain. Considerably less attachment to the terminal alkane carbons would be expected. Attachment to the two positions would be favored. The diphenylalkanes may, therefore, be characterized by the formula:

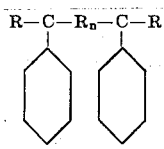

wherein each R is a saturated hydrocarbon and $n$ is an integer of from 6 to 16.

It is noted, however, that the structure of the entire saturated hydrocarbon chain, alkyl portion, will correspond to the $n$-paraffins fed into the alkylation process. These $n$-paraffins range from $C_{10}$ to $C_{18}$ or higher as employed in the production of linear alkylbenzenes.

Since a homologous series of alkanes are reacted and since numerous by-products result, separation of the various compounds in fraction 4 is incomplete because of overlap of boiling points. The general composition of typical diphenylalkanes as determined by mass spectrometry, obtained from commerical sources, is as follows:

|  | Range in Percent |
|---|---|
| Monoalkylbenzene | 15–24 |
| 1,4 dialkyltetralins | 18–21 |
| diphenylalkanes | 58–36 |
| dialkylbenzenes | 4–7 |
| other hydrocarbons | 5–12 |

Since the diphenylalkanes are complex isomeric mixtures, it is extremely difficult to characterize them exactly. The diphenylalkanes we employ are those produced in alkylating benzene with chlorinated $n$-paraffins of 10 to 18 carbon atoms and recovered as the bottoms from a fractionating column. They are more specifically characterized for identification purposes as having an average molecular weight of 300–325 and an initial boiling point of about 590° F. as determined by the ASTM method D158. In general they boil in the range from about 590°–770° F. The viscosity at 100° F. ranges from about 48 to about 55 S.U.S. We can also employ diphenylalkanes obtained from any process, provided they contain at least 10 carbon atoms in the alkyl portion of the diphenylalkane and have the same specific characteristics, i.e., Initial Boiling Point (I. B. P.), viscosity and average molecular weight.

In practicing the present invention 1 part by weight of the crude diphenylalkanes and from about 0.8 to about 1 part by weight of 98 percent sulfuric acid are mixed in a glass lined Pfaudler kettle. To this mixture is then added from about 0.75 to about 0.85 parts by weight of chlorosulfonic acid while maintaining the sulfonation reaction temperature below 80° C., and preferably between 25°–65° C. with blowing to remove the hydrogen chloride. Blowing is continued for about 1–2 hours until all the hydrogen chloride is removed.

To the sulfonated mixture, after all the hydrogen chloride is removed, water in an amount of about .4 parts by weight based on 1 part by weight of the crude diphenylalkanes used is added slowly with agitation at a rate to permit the temperature rise to 70°–80° C. and the mixture held at this temperature for a period of time ranging from 3–4 hours or until a phase separation is obtained. The lower liquid acid phase is drawn off and discarded.

The upper phase, diphenylalkane sulfonic acids in which each benzene ring contains one sulfonic acid group, is mixed with water (about 1.3–1.5 parts by weight based on 1 part by weight of the crude diphenylalkanes) and an alkali metal hydroxide added with agitation (preferably about 0.6 parts by weight of 50 percent aqueous alkali metal hydroxide based on 1 part by weight of the crude diphenylalkanes employed) to form the corresponding diphenylalkane sulfonic acid salts. The latter solution is allowed to cool to room temperature, and if desired held at room temperature for several hours. After cooling to room temperature, the solution is either hazy or cloudy to which is added isopropyl alcohol (about 10 percent to about 15 percent by weight based on the weight of the di-alkali metal salt solution). The resulting clear solution is drawn off and adjusted, if necessary, to a total solid content of 45 percent. The total solid content may be varied as desired by evaporating the water from the clear solution in any of the usual ways. In the dried form, the product is a dark amber colored free flowing powder having a minimum active content of 90 percent.

It is to be noted that instead of using an alkali metal hydroxide to form the salts of the diphenylalkane sulfonic acids, we can employ other basic materials such as barium, calcium and magnesium hydroxides, or organic bases such as mono-, di- and tri- ethanol amines; methyl, dimethyl and trimethyl amines; ethyl, diethyl and triethyl amines; diisopropyl and triisopropyl amines, N-methyl diethanolamine, N-dimethylethanolamine, N-ethyl diethanolamine, N-diethylethanolamine, and the like.

The disodium salts of the diphenylalkane sulfonic acid prepared accordance with the present invention are soluble in water and in aqueous solution of acids, bases and salts. They are readily soluble in 10 percent aqueous caustic soda solutions. They are surface active agents and exhibit surface active properties in aqueous solutions of strong electrolytes such as acids, bases and salts.

Since the alkyl chain in the diphenylalkanes is essentially linear, the salts of the diphenylalkane sulfonic acids are biodegradable. They are useful as wetting and emulsifying agents and as commercial detergents which are biodegradable by any of the commonly-used tests. Above all, they are reasonably priced per lb. and as a consequence very competitive with commercial detergents currently on the market.

The following examples will demonstrate how the invention may be practiced. All parts given are by weight.

EXAMPLE I

The diphenylalkanes employed analyzed as having an average molecular weight of 315, a viscosity of 50.6 S.U.S. at 100° F., as determined by ASTM method D158, and the following distillation characteristics:

|  | °F. |
|---|---|
| I.B.P. | 600 |
| 10% | 693 |
| 50% | 726 |
| 94% | 760 |
| End point | 768 |

To 300 parts of the above crude diphenylalkanes and 300 parts of conc. sulfuric acid (98–100 percent) in a glass lined Pfaudler kettle 245 parts of chlorosulfonic acid were added with stirring while maintaining the reaction temperature between 25° and 30° C. and blowing the generated hydrogen chloride. Blowing was continued until all the hydrogen chloride was removed. To the resulting reaction mixture 123 parts of water was added with agitation at a rate to permit the temperature of the reaction mixture to rise to 70°–80° C. After the water addition, agitation was stopped and the mixture held at 70°–80° C. for 3 hours at which time phase separation occurred. The lower dilute acid phase was drawn off and discarded.

The sulfonated diphenylalkanes (about 450 lbs) were added slowly into a kettle containing 590 parts of a 15.25 percent caustic soda solution (prepared by adding 180 parts of 50 percent aqueous caustic to 410 parts of water and mixing). The product was allowed to cool and held without agitation for 24 hours. To the hazy solution, 10 percent of isopropyl alcohol (about 104 parts) was added. After 1 hour of standing a clear and stable solution was obtained which was adjusted to a total solid content of 45 percent. The pH of a 5 percent solution was 8.5. The specific gravity was 1.16.

EXAMPLE II

Example 1 was repeated with the exception that 300 parts of crude diphenylalkanes were employed having an average molecular weight of 310, a viscosity of 50 S.U.S. at 100° F., as determined by ASTM method D 158, and an initial boiling point of 595° F. and an endpoint of 758° F. The pH of a 5 percent solution was 9.0. The specific gravity was 1.13.

EXAMPLE III

Example 1 was again repeated with the exception that 300 parts of crude diphenylalkanes were employed having an average molecular weight of 320, boiling in the range of from 605°–750° F. and a viscosity of 52.8 S.U.S. at 100° F as determined by the ASTM method D 158. Gas-Liquid phase chromatography indicated a dialkylbenzene content of 4 percent and a diphenylalkane content of 53 percent. The pH of a 5 percent solution of the sulfonated product was 8.3. The specific gravity was 1.19.

The disodium salts of the diphenylalkane sulfonic acids of Example I to III are suitable for application such as, for example, oil well treating, metal cleaning, cleaning of ceramic tiles and walls, textile industry (mercerizing cotton), paper industry, etc. These salts, as previously noted, are biodegradable. The biodegradable characteristics were determined by the procedure outlined in Example VII of U.S. Pat. No. 3,316,294.

The wetting time of the products of Examples I to III were determined on water and on aqueous solutions of acid, base and salt respectively containing 0.1 percent by weight of the dried product. The method employed for measuring relative wetting power of the aqueous solutions on cotton tape is the well known "Draves Wetting Time-Synthron Tape Modification." The following Table identifies the aqueous solutions employed in the wetting time test and shows the wetting time in minutes:

TABLE

| Aqueous Solution Kind | Wetting Time, Min. Product of Example | | |
|---|---|---|---|
| | 1 | 2 | 3 |
| Water | 0.9 | 1.0 | 0.8 |
| 20% NaOH | 3.0 | 2.9 | 3.1 |
| 10% NaOH | 2.0 | 1.8 | 2.1 |
| 10% HCL | 0.8 | 0.9 | 0.9 |
| 20% CaCl$_2$ | 2.7 | 2.8 | 2.8 |

From the foregoing specification it becomes clearly manifest that the by-product, diphenylalkanes, hitherto considered of no commercial value and especially of no direct value as a surfactant precursor, is economically and without resorting to involved precedures converted to a useful low cost biodegradable surfactant.

In addition to the foregoing applications, it has been determined that the surfactants prepared in accordance with the present invention are excellent additives to reduce the viscosity of slurries. Because of their dispersing and wetting ability, they are particularly adaptable for pasting and dispersing essentially insoluble dyes. Their coupling power, i.e. ability to solubilize insoluble and slightly soluble materials is comparable to Sodium Xylene sulfonate. The surfactants are stable after boiling for 3 days in 10 percent NaOH. Because of their solubility and coupling power in strong electrolytes, they are excellent hard surface detergents.

We claim:

1. The clear and stable aqueous solution having a total solids content of about 45 percent of the biodegradable surfactant consisting essentially of the alkali metal salt of diphenylalkane disulfonic acids prepared by sulfonating 1 part by weight of diphenylalkanes; present in a bottoms fraction obtained as a by-product in the alkylation of benzene with a chlorinated alkane in which the alkane is selected from the group consisting of $C_{10}$ – $C_{18}$ normal paraffins, said diphenylalkanes consisting of a mixture containing essentially 15–24 percent of monoalkylbenzene, 18–21 percent of 1,4-dialkyltetralins, 36–58 percent of diphenylalkanes and 4–7 percent of dialkylbenzene, said mixture having an average molecular weight of from 300 to 325, boiling in the range of 590° to 770° F. and having a viscosity of about 48 to about 55 S.U.S. at 100° F.; with 0.75 to 0.85 parts by weight of chlorosulfonic acid at a temperature below 30° C. for a period of time sufficient to remove hydrogen chloride that is evolved, diluting the resulting sulfonated diphenylalkanes with water and permitting the temperature to rise to 70°–80° C. and holding at said temperature until a two phase separation is obtained, discarding the lower liquid acid phase and neutralizing the remaining phase with an alkali metal hydroxide to form an aqueous cloudy liquid containing the alkali metal salt of the diphenylalkane disulfonic acids followed by adding to said liquid to clear the same a water soluble organic compound in an amount equal to about 10 to 15 percent by weight of said cloudy liquid and selected from the class consisting of alkyl alcohol of from one to three carbon atoms, alkyl ketone of from three to five carbon atoms, glycol of from two to four carbon atoms, diacetone alcohol and dioxane.

2. The clear and stable aqueous solution of the biodegradable surfactant prepared according to claim 1 wherein the said diphenylalkane by-product has an average molecular weight of 315, a viscosity of 50.6 S.U.S. at 100° F. and a boiling range from 600° to 768° F.

3. The clear and stable aqueous solution of the biodegradable surfactant prepared according to claim 1 wherein the said average molecular weight is 310, viscosity of 50 S.U.S. at 100° F. and a boiling range from 595° to 758° F.

4. The clear and stable aqueous solution of the biodegradable surfactant prepared according to claim 1 wherein the said average molecular weight is 320, viscosity of 52.8 S.U.S. at 100° F. and a boiling range from 605° to 750° F.

5. The clear and stable aqueous solution of the biodegradable surfactant prepared according to claim 1 wherein the alkali metal hydroxide is sodium hydroxide.

6. The process of preparing water soluble alkali metal salts of diphenylalkane disulfonic acids which comprises sulfonating 1 part by weight of diphenylalkanes; present in a bottoms fraction obtained as a by-product in the alkylation of benzene with a chlorinated alkane in which the alkane is selected from the group consisting of $C_{10}$ – $C_{18}$ normal paraffins, said diphenylalkanes consisting of a mixture containing essentially 15–24 percent of monoalkylbenzene, 18–21 percent of 1,4-dialkyltetralins, 36–58 percent of diphenylalkanes, and 4–7 percent of dialkylbenzene, said mixture having an average molecular weight of from 300 to 325, boiling in the range of 590° to 770° F. and having a viscosity of about 48 to about 55 S.U.S. at 100° F.; with 0.75 to 0.85 parts by weight of chlorosulfonic acid at a temperature below 30° C. for a period of time sufficient to remove hydrogen chloride that is evolved, diluting the resulting sulfonated diphenylalkanes with water and permitting the temperature to rise to 70°–80° C. and holding at said temperture until a two phase separation is obtained, discarding the lower liquid acid phase and neutralizing the remaining phase with an alkali metal hydroxide to form an aqueous cloudy liquid containing the alkali metal salt of the diphenylalkane disulfonic acids followed by adding to said liquid to clear the same about 10–15 percent by weight of said liquid of a water soluble organic compound selected from the class consisting of alkyl alcohol of from one to three carbon atoms, alkyl ketone of from three to five carbon atoms, glycol of from two to four carbon atoms, diacetone alcohol and dioxane and adjusting the total solids content of the thus obtained clear solution to about 45 percent.

7. The process according to claim 6 wherein the said diphenylalkane by-product has by an average molecular weight of 315, a viscosity of 50.6 S.U.S. at 100° F. and a boiling range from 600° to 768° F.

8. The process according to claim 6 wherein the said diphenylalkane by-product has by an average molecular weight of 310, a viscosity of 50 S.U.S. at 100° F. and a boiling range from 595° to 758° F.

9. The process according to claim 6 wherein the said diphenylalkane by-product has by an average molecular weight of 320, a viscosity of 52.8 S.U.S. at 100° F. and a boiling range from 605° and 750° F.

10. The process according to claim 6 wherein the said alkali metal hydroxide is sodium hydroxide.

* * * * *